W. A. GRIFFING.
TWO-SPEED MECHANISM.
APPLICATION FILED DEC. 15, 1913.
1,179,911. Patented Apr. 18, 1916.
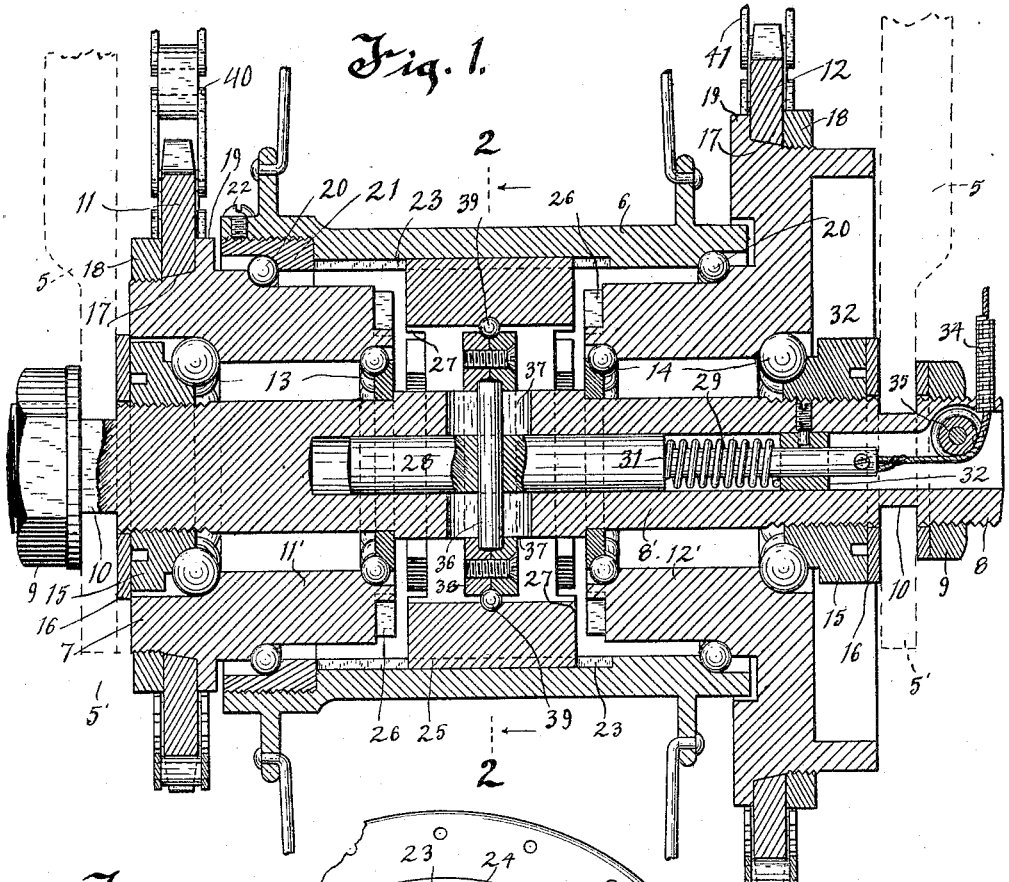
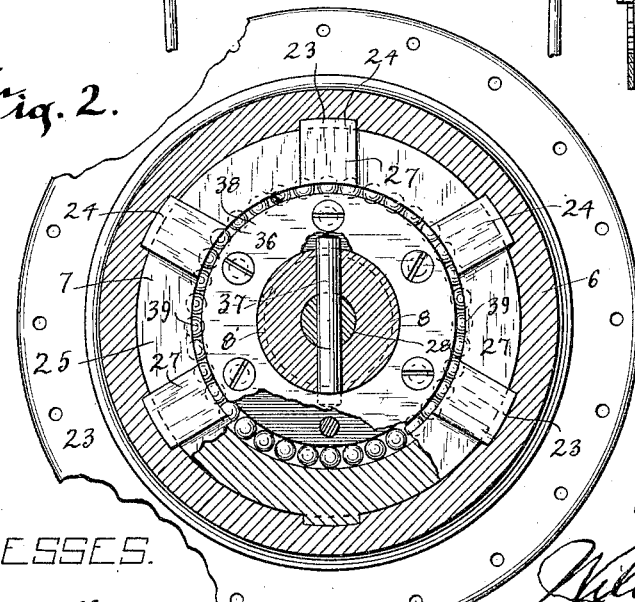
WITNESSES.
C. F. Miller.
Katherine Holt
INVENTOR
William A. Griffing
By Morsell & Caldwell
ATTORNEYS.
THE COLUMBIA PLANOGRAPH CO., WASHINGTON, D. C.

UNITED STATES PATENT OFFICE.

WILLIAM A. GRIFFING, OF MEDICINE HAT, ALBERTA, CANADA.

TWO-SPEED MECHANISM.

1,179,911.  Specification of Letters Patent.  Patented Apr. 18, 1916.

Application filed December 15, 1913. Serial No. 806,920.

*To all whom it may concern:*

Be it known that I, WILLIAM A. GRIFFING, a citizen of the United States, and resident of Medicine Hat, in the State of Alberta and Dominion of Canada, have invented new and useful Improvements in Two-Speed Mechanism, of which the following is a description, reference being had to the accompanying drawings, which are a part of this specification.

It is one of the objects of the present invention to provide a two speed mechanism more particularly although not solely adapted for use in motor cycle construction.

In the ordinary construction of speed changing devices gears are moved into and out of mesh with each other in changing speeds and during this operation the teeth of some of the gears are often stripped when the change is made too fast by a careless operator.

It is one of the objects of the present invention to obviate the before mentioned objectionable feature and provide a two speed mechanism in which gears are entirely eliminated.

A further object of the invention is to provide a two speed mechanism in which the drive is direct for both high and low speeds.

A further object of the invention is to provide a two speed mechanism in which the parts are so constructed as to run normally in high speed position.

A further object of the invention is to provide a two speed mechanism which is of simple construction, is strong and durable and is well adapted for the purpose described.

With the above and other objects in view, the invention consists of the improved two speed mechanism and its parts and combinations as set forth in the claims, and all equivalents thereof.

In the accompanying drawing in which the same reference characters indicate the same parts in all of the views: Figure 1 is a horizontal sectional view of the improved two speed mechanism shown as forming part of the driving wheel of a motorcycle; and Fig. 2 is a transverse sectional view thereof taken on line 2—2 of Fig. 1.

Referring to the drawing the numeral 5 indicates the rear forks of a motorcycle frame, 6 the hub portion of the driving or traction wheel and 7 the improved two speed mechanism thereof. The two speed mechanism is adjustably connected to the forks 5 by the rear axle or fixed shaft 8 which is clamped thereto by nuts 9 threaded on the opposite ends thereof and impinging against the said forks. The opposite end portions 9 of the axle on opposite sides are recessed to form slabbed portions 10 which are engaged by the rear forked ends 5' of the forks 5 to properly position the axle between the forks. High and low speed sprocket wheels 11 and 12 positioned at opposite ends of the wheel hub are journaled on the axle 8 by means of ball bearings 13 and 14 respectively and freely and independently rotate thereon. These ball bearings are of ordinary form and are adjusted by means of cone members 15 and set collars 16 which are threaded on the axle 8. The sprocket wheels 11 and 12 are separable from the hubs 11' and 12' thereof and are fixedly held on tapered portions 17 of the sprocket hubs by nuts 18 threaded thereon which clamp the said sprockets on the hubs and against annular shoulders 19 formed thereon. This construction of hubs provides for substituting sprocket wheels of different diameters without separating other portions of the two speed mechanism. The sprocket hubs are of elongated form and each inner portion extends into the wheel hub about one-third the length of the wheel hub and the said wheel hub is journaled on the sprocket hubs by means of bearing balls 20 interposed between shouldered portions of said hubs. These last mentioned ball bearings are adjusted by means of the cone sleeve 21 threaded in one end of the wheel hub and the lock screw 22 impinging thereagainst.

The inner peripheral wall of the wheel hub is provided with longitudinal grooves 23 into which extend the radial projections 24 of the clutch member 25 which is slidably mounted within the wheel hub and between the inner recessed clutch faces 26 of the sprocket hubs. The clutch member 25 is in the form of a collar which surrounds the axle 8 and on its opposite faces is provided with clutch teeth 27 which coincide with the projections and are adapted to enter the recesses of the clutch faces 26 to lock the wheel hub to one or the other of the sprocket wheel hubs. The clutch member is of such axial length that when in an intermediate position between the two sprocket hubs the said member will be free from clutching engagement with said hubs and the wheel is free to turn on the hubs.

A portion 8' of the axle is of tubular form and has positioned within the bore thereof a plunger rod 28 which is normally held in its innermost position by a coiled spring 29. The spring surrounds a reduced portion 30 of the rod and is interposed between the shoulder 31 formed by the said reduction and a collar 32 mounted within the outer end portion of the axle bore and through which the rod freely slides. The collar 32 is releasably held in position by a screw 33. The outward movement of the plunger rod is controlled by a Bowden wire 34 which is connected to the outer end of the rod and passes over a grooved pulley 35 mounted in the outer end of the bore of the axle and then extends at right angles to a convenient point of control.

The plunger rod at a point between the inner ends of the sprocket hubs is provided with a transverse pin 36 which extends through elongated slots 37 formed in the tubular portion of the axle and into a ball bearing clutch collar 38. The said collar is connected to the clutch member 25 by bearing balls 39 which extend into annular grooves in each part so that while the clutch member can freely rotate on the clutch collar the said member will be moved laterally thereby. The clutch collar for convenience in interposing the balls between the said collar and the clutch member is formed in two parts bolted together.

The sprocket wheels 11 and 12 are of different diameters to provide for driving the wheel 6 at different speeds and are provided with sprocket chains 40 and 41 which extend to and are driven by the engine or other source of motion (not shown).

In operation both sprocket wheels are driven from the source of power and with the clutch member in the position shown in Fig. 1 they will both run free on the axle and in the traction wheel hub. Now if the Bowden wire be released or slackened the spring will force the plunger rod inwardly and the clutch member into engagement with the hub of the high speed sprocket wheel and lock said sprocket wheel to the hub of the traction wheel and the said traction wheel will be rotated. If it is now desired to reduce the speed it is only necessary to pull on the Bowden wire to slide the clutch member into engagement with the low speed sprocket wheel and the speed of the traction wheel will be reduced on account of the larger diameter of said sprocket wheel.

From the foregoing description it will be seen that the two speed mechanism is of simple construction, is strong and durable and the use of gears is entirely eliminated.

What I claim as my invention is:

1. A two speed mechanism, comprising a shaft, driving members of relatively different speeds of rotation journaled thereon, a wheel journaled on and interposed between the driving members, and a clutch member slidably engaging the wheel and interposed between the driving members for locking one or the other of said driving members to the wheel.

2. A two speed mechanism, comprising a shaft having a tubular portion, driving members of relatively different speeds of rotation journaled thereon, a wheel journaled on and interposed between the driving members, a clutch member slidably engaging the wheel and interposed between the driving members, and means extending through the tubular portion of the shaft for moving the clutch member into locking engagement with one or the other of said driving members or to a disengaging position between the two members.

3. A two speed mechanism, comprising a shaft having a tubular portion, driving sprocket wheels journaled thereon in spaced relation and having relatively different speeds of rotation, a traction wheel interposed between and journaled on the hubs of the sprocket wheels, a clutch member slidably connected to the traction wheel and interposed between the hubs of the sprocket wheels, a plunger rod slidably positioned within the tubular portion of the shaft, a connection between the plunger rod and the clutch member, and means controlling the movement of the plunger rod to move the clutch member into locking engagement with one or the other of the hubs of said sprocket wheels or to a disengaging position between the two hubs.

4. A two speed mechanism, comprising a fixed shaft having a tubular portion, driving sprocket wheels journaled thereon in spaced relation and having relatively different speeds of rotation, the hub portions of said wheels having clutch faces formed thereon, a traction wheel having its hub journaled on the hubs of the sprocket wheels, a clutch member slidably mounted within and connected to the hub of the traction wheel, said clutch member having clutch faces which are adapted to engage the clutch faces of the sprocket wheel hubs, a plunger rod mounted within the tubular portion of the shaft and having a connection with the clutch member, a coiled spring controlling the movement of the plunger rod in one direction, and means controlling the movement of the plunger rod in the opposite direction.

In testimony whereof, I affix my signature, in presence of two witnesses.

WILLIAM A. GRIFFING. [L. S.]

Witnesses:
G. L. FRASER,
SAMUEL SHORT.

Copies of this patent may be obtained for five cents each, by addressing the "Commissioner of Patents, Washington, D. C."